(12) United States Patent
Birkwald et al.

(10) Patent No.: US 9,429,221 B2
(45) Date of Patent: Aug. 30, 2016

(54) STEERING PINION FOR A STEERING SYSTEM AND METHOD FOR THE PRODUCTION THEREOF

(75) Inventors: Frank Birkwald, Ostfildern (DE); Christian Ziegler, Esslingen (DE); Hubert Heck, Dusseldorf (DE); Paul Schwarzhans, Feldkirch (AT); Roger Kollmeier, Stuttgart (DE); Aksel Maier, Pluderhausen (DE); Kai Vohwinkel, Reichenbach (DE)

(73) Assignee: THYSSENKRUPP PRESTA AKTIENGESELLSCHAFT, Liechtenstein (LI)

(*) Notice: Subject to any disclaimer, the term of this patent is extended or adjusted under 35 U.S.C. 154(b) by 234 days.

(21) Appl. No.: 14/035,272

(22) PCT Filed: Jul. 13, 2012

(86) PCT No.: PCT/EP2012/063841
§ 371 (c)(1),
(2), (4) Date: Jan. 10, 2014

(87) PCT Pub. No.: WO2013/010958
PCT Pub. Date: Jan. 24, 2013

(65) Prior Publication Data
US 2014/0137682 A1  May 22, 2014

(30) Foreign Application Priority Data

Jul. 15, 2011  (DE) .................. 10 2011 079 274

(51) Int. Cl.
*F16H 55/22* (2006.01)
*B62D 3/12* (2006.01)
(Continued)

(52) U.S. Cl.
CPC ............... *F16H 55/22* (2013.01); *B62D 3/12* (2013.01); *F16D 1/064* (2013.01); *F16H 57/0025* (2013.01); *Y10T 29/49464* (2015.01); *Y10T 74/1967* (2015.01)

(58) Field of Classification Search
CPC ........ B21K 25/00; B23P 11/00; F16H 55/22; F16H 57/0025; F16D 1/064; B62D 3/12; Y10T 29/49464; Y10T 74/1967
See application file for complete search history.

(56) References Cited

U.S. PATENT DOCUMENTS

| | | | | |
|---|---|---|---|---|
| 3,895,422 A | * | 7/1975 | Graafsma | B21K 1/30 29/893.34 |
| 4,574,648 A | * | 3/1986 | Debello | F02N 15/06 74/7 A |
| 6,280,115 B1 | * | 8/2001 | Beier | F01L 1/047 29/509 |

(Continued)

FOREIGN PATENT DOCUMENTS

| | | |
|---|---|---|
| DE | 102 60 426 B3 | 6/2004 |
| DE | 103 47 101 A1 | 5/2005 |

OTHER PUBLICATIONS

PCT/EP2012/063841 International Search Report dated Nov. 10, 2012.

*Primary Examiner* — Darlene P Condra
(74) *Attorney, Agent, or Firm* — Haynes and Boone, LLP (57) ABSTRACT

Steering pinions and methods for producing the same are described. The steering pinion has a toothed section for meshing with a gear rack and a connection section for connecting to a steering shaft. The toothed section includes a toothed part and the connection section includes a connection part. The toothed part and the connection part are pressed together in a rotationally fixed manner.

18 Claims, 4 Drawing Sheets

(51) Int. Cl.
*F16H 57/00* (2012.01)
*F16D 1/064* (2006.01)

(56) References Cited

U.S. PATENT DOCUMENTS

| | | | | |
|---|---|---|---|---|
| 6,293,164 B1* | 9/2001 | Krause | ............... | B21C 23/08 |
| | | | | 29/893.3 |
| 6,920,804 B2* | 7/2005 | Pattok | ............... | B62D 3/12 |
| | | | | 384/559 |
| 2005/0061101 A1* | 3/2005 | Grobel | ............... | F16H 55/17 |
| | | | | 74/457 |
| 2005/0257635 A1* | 11/2005 | Damore | ............... | B62D 3/123 |
| | | | | 74/422 |
| 2007/0068726 A1 | 3/2007 | Shimizu | | |
| 2007/0205572 A1* | 9/2007 | Kubota | ............... | B62D 3/123 |
| | | | | 280/93.514 |
| 2007/0272471 A1* | 11/2007 | Kuroumaru | ............... | B62D 5/0412 |
| | | | | 180/444 |
| 2010/0243367 A1* | 9/2010 | Suzuki | ............... | B62D 5/0409 |
| | | | | 180/444 |
| 2011/0099793 A1* | 5/2011 | Pulnikov | ............... | B23P 11/00 |
| | | | | 29/525 |
| 2011/0247891 A1* | 10/2011 | Meyer | ............... | B60R 13/08 |
| | | | | 180/443 |
| 2013/0091979 A1* | 4/2013 | Bareis | ............... | B62D 3/123 |
| | | | | 74/568 R |

* cited by examiner

STEERING PINION FOR A STEERING SYSTEM AND METHOD FOR THE PRODUCTION THEREOF

CROSS REFERENCE TO RELATED APPLICATIONS

This application is a national stage of International Application No. PCT/EP2012/063841, filed Jul. 13, 2012, which claims priority from German Patent Application No. 10 2011 079 274.0 filed on Jul. 15, 2011 in the German Patent and Trademark Office, the disclosure of which is incorporated herein by reference in its entirety.

BACKGROUND

1. Technical Field

The present invention relates to a steering pinion for a steering system of a motor vehicle and a method for the production of such a steering pinion.

2. Related Art

Steering pinions as coupling connections between the steering shaft and the gear rack of a motor vehicle are known in the prior art. These steering pinions are provided in order to transmit to a gear rack the torque applied to the steering shaft by the driver via the steering wheel. The gear rack in turn acts via the track rods to swivel the corresponding wheels of the vehicle. Such a steering pinion accordingly comprises a toothed section, which meshes with the teeth of the gear rack, and a connection section, which connects the steering pinion to the steering shaft. The toothed section typically has helical toothing, which is meshed with corresponding toothing in the gear rack.

In the prior art, steering pinions are formed in one piece, and are typically manufactured from a material which has high strength, in order to achieve reliable functioning and a long service life in the toothed section.

In this context, GB 953,793 is cited as an example which shows such a steering pinion. The steering pinion which it discloses is formed as a single part and, in accordance with its use, is formed from a high-strength material.

DE 10 2009 029 407 A1 discloses a method for manufacturing a steering pinion by initial machining of a semi-finished product, then a subsequent rolling operation. The steering pinion is formed as a single part.

From U.S. Pat. No. 3,688,374, a method of producing a one-piece steering pinion by cold forming is known.

Furthermore, from DE 102 60 426 B3, a one-piece steering pinion is known, which is produced by cold or hot working.

Typically, the diameter of the toothed section is greater than the diameter of the shaft and the connection section. When a conventional steering pinion is produced, high processing costs are accordingly incurred, since the connection section must be formed to the lower diameter either by turning or by laborious reshaping.

From US 2007/0068726 A1, a steering apparatus with electrical steering support is known, wherein a steering pinion is provided which has a pinion-side shaft and a torque-side shaft which are linked together by means of a linking pin.

SUMMARY

The present disclosure describes a steering pinion which can be produced using a reduced amount of material and with reduced production costs, and provides a method for producing such a steering pinion.

The steering pinion, which can be used as a coupling connection between the steering shaft and gear rack of a motor vehicle, comprises a toothed section for meshing with a gear rack, and a connection section for connecting to a steering shaft. According to the present disclosure, a toothed part having the toothed section and a connection part having the connection section are provided, wherein the toothed part and the connection part are pressed together in a rotationally fixed manner.

By forming the steering pinion from two components, namely the toothed part having the toothed section and the connection part having the connection section, both the toothed part and the connection part can be formed in accordance with the demands placed respectively upon each. Thus, the steering pinion can be produced using a reduced amount of material.

In particular, the toothed part may be manufactured using a solid piece of high-grade material, so that the toothed part, and in particular the toothing itself, can withstand the operational loads. The connection part, on the other hand, can be formed from a less high-grade material, and be hollow.

Furthermore, the division of the steering pinion into a toothed part and a connection part enables its production to be simplified, since the connection part can be supplied already with the desired thickness and/or with the desired diameter, with the result that appropriate turning of the shaft or laborious reshaping of the connection section of the connection part is unnecessary.

Because the parts are pressed together in a rotationally fixed manner, it is further possible to dispense with separate method steps for producing the rotationally fixed connection. For example the insertion of a pin, a bolt or another connection means can be dispensed with, so that production can be simplified. Furthermore, the pressing together creates a fully play-free connection, at least with respect to rotation, which enables precise functioning of the steering and a long service life to be achieved. Accordingly, in one embodiment, the connection is made by pressing together without additional connecting components or additional securing components.

In order to further simplify production while still achieving a rotationally fixed connection which satisfies the demands placed upon a steering pinion, the connection part and the toothed part advantageously overlap. In particular, a fixing section of the toothed part overlaps with a fixing area of the connection part. The steering pinion can accordingly be produced by pushing the toothed part into the connection part, and subsequently pressing them together.

The connection between the toothed part and the connection part is, in one embodiment, formed to be durable and not disassemblable. The term "not disassemblable" is to be understood here as meaning that the design of the connection is such that no disassembly of the toothed part and the connection part is provided. In particular, disassembly and subsequent reassembly is not provided. It can thus even be conceivable and possible that the toothed part and the connection part cannot be disassembled in a manner that would allow them to be subsequently reassembled. In this case, disassembly of the connection between the connection part and the toothed part cannot therefore be carried out without destroying the parts.

In order further to improve the resistance to rotation between the toothed part and the connection part, the fixing section can have at least one material elevation, for example, in the form of a knurl and/or a nub and/or a roller-burnished region.

In an embodiment, in the fixing section and/or the fixing area, material elevations and/or material depressions are provided, such as nubs, knurls, roller-burnished regions and/or grooves, to increase the available torque transmission. By the use of such connecting means, positive locking for the connection can be provided, in addition to non-positive locking.

In a further advantageous embodiment, in order to increase the available torque transmission, the fixing section and/or the fixing area are formed conically.

In order to reduce the material costs and the weight of the steering pinion, the toothed part and the connection part can, in an embodiment, use different materials, and thereby be efficiently adapted to their different tasks.

Less weight combined with reliable functioning results when the toothed part is manufactured from a solid piece and the connection part is formed from a tube. In this case the toothed part can be manufactured in a cold forming process. Cost-effective provision of the connection part is also achieved due to the widespread and inexpensive availability of tubes with standard dimensions.

Simple production and reliable functioning result if the connection part and the toothed part are connected to each other either non-positively, or both positively and non-positively. An even simpler production can be achieved by the fixing of the connection part to the toothed part by a pressing operation only. In an embodiment, the fixing section is at least in part conical, in order to facilitate assembly.

The toothed part, in an embodiment, has a depression, for example, a groove and/or a recess around all or part of its circumference, into which material of the connection part is introduced, such as by knurling and/or roller burnishing and/or pressing-on and/or rolling, in order to form a positive connection as a protection against separation.

In an exemplary embodiment, the depression can have at least one serration or knurl, in order to enable the creation of a connection between the connection part and the toothed part that is as rotationally fixed as possible.

The toothed part, in an embodiment, has a bearing seat to accommodate a rolling bearing, which can serve as a radial bearing and/or an axial bearing for the steering pinion.

In another embodiment, the rolling bearing is held compressively between the connection part and the toothed part, and in this manner retained positively and under pre-tension between the connection part and the toothed part. In this case, the rolling bearing is particularly retained positively in the radial direction and under pre-tension in the axial direction.

In yet another embodiment, the connection part and the toothed part are pressed together in a rotationally fixed manner and the rolling bearing is simultaneously clamped, or pre-tension is applied such that it is retained fixedly with its inner ring on the steering pinion. In other words, pressing the connection part and the toothed part together in a rotationally fixed manner can at the same time achieve secure fixing of the rolling bearing.

The term "pressed together in a rotationally fixed manner" is understood here to mean that the connection part and the toothed part are connected by the pressing and the non-positive locking resulting therefrom, and in one embodiment, the press fit that is formed, in such a manner that the torques applied via the connection part can be transmitted to the toothed part via the connection that is formed by pressing. A certain amount of positive locking can additionally be provided, in particular by pressing above a knurled or roller-burnished section, or by means of an additional possible rolling of material into a serrated section.

A method for the production of a steering pinion with a toothed section for meshing with a gear rack and a connection section for connecting to a steering shaft comprises the steps of providing a toothed section having the toothed part and providing a connection section having the connection part. The toothed part and the connection part are subsequently connected together in a rotationally fixed manner, and the parts are pressed together in order to produce the rotationally fixed connection.

In this manner a reliable production method is provided, by means of which a steering pinion can be produced with efficient use of material.

A rolling bearing can be accommodated, prior to the connection of the toothed part with the connection part, on a bearing seat of the toothed part. In one embodiment, the rolling bearing is pressed between the toothed part and the connection part with the application of pre-tension to the rolling bearing.

In order to provide protection against the connection being pulled apart, at least one depression, such as in the form of a groove and/or a recess, can be formed in the toothed part, and material of the connection part can be introduced into the depression, in particular by roller burnishing or by framing a bead. In this case, the circumferential edges of the depression in the form of a circumferential groove can, in one embodiment, have a serration, into which the pressed-on connection part is introduced as it is roller-burnished or rolled into shape, thus providing an additional positive connection.

In an exemplary embodiment, the method for the production of a steering pinion with a toothed section for meshing with a gear rack of a motor vehicle steering system and with a connection section for connecting the steering pinion to a steering shaft comprises at least the following steps: providing a toothed part having the toothed section and a fixing section; providing a connection part having the connection section and a fixing area, wherein a receptacle in the form of an opening for receiving the fixing section of the toothed part is formed in the fixing area; forming a material elevation, such as in the form of a roller-burnished region and/or a knurl, on the fixing section, such that the material is elevated beyond the original external diameter of the fixing section and its inscribed diameter is greater than the internal diameter of the opening of the connection part; and pressing the fixing area together with the fixing section to form a non-positive connection.

In an exemplary embodiment, the receptacle in the form of the opening is perfectly cylindrical, and the diameter of the opening is enlarged by less than 0.2 mm during the pressing. The term "perfectly cylindrical" is to be understood in the present disclosure to mean a shape which deviates from an exact cylindrical shape only by normal manufacturing tolerances.

In one embodiment, prior to the connection of the toothed part with the connection part, a rolling bearing can be accommodated on a bearing seat of the toothed part. In this manner, a particularly efficient production of the steering pinion can take place.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs, and repeated description of these elements is in part dispensed with in the description below, in order to avoid redundancy.

Figure 1:
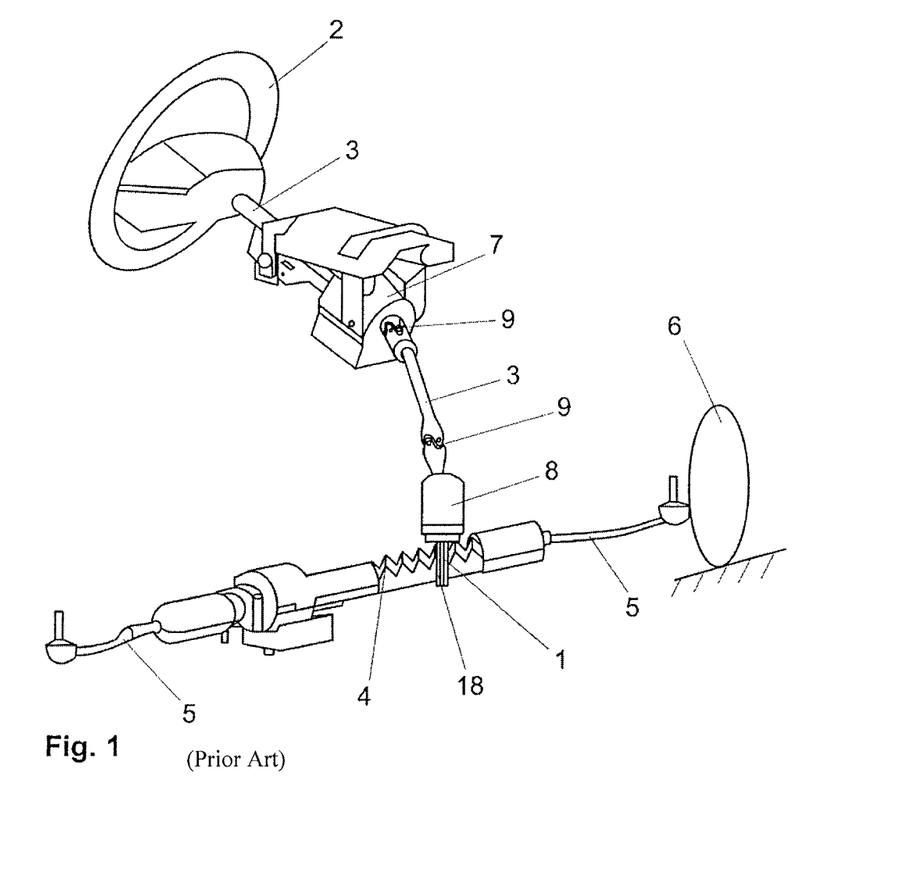
FIG. 1 is a schematic diagram of a typical steering system.

FIG. 1 shows schematically the structure of a typical steering system of a motor vehicle. Accordingly, a steering wheel 2 is provided, by means of which the driver carries out the steering movements, which must then be transmitted to the wheels 6 in order to bring about a change in the direction of the motor vehicle.

The steering movements of the steering wheel 2 are transmitted via a steering shaft 3 to a steering pinion 1, which has a toothed area which meshes with a gear rack 4. The rotation of the steering pinion 1 causes the gear rack 4 to move translationally along its axis. The gear rack 4 is connected to track rods 5, which in turn transmit the translational movement of the gear rack 4 into a steering movement of the schematically-shown wheels 6.

The steering forces can be increased and/or assisted by a power steering system 7 or 8. In the example embodiment of a typical steering system that is shown, the schematically-indicated power steering systems 7, 8 are disposed between the steering wheel 2 and the steering pinion 1. A power steering system 7, 8 can thereby either provide pure power assistance, or alternatively—or in combination with this function—it can also increase the steering angle when this is demanded by the applicable control system of the motor vehicle.

The steering shaft 3 is usually formed from multiple parts, and extends from the steering wheel 2 to the steering pinion 1, with the installation path of the steering shaft adapted by means of universal joints 9 to the installation conditions of the particular motor vehicle.

The steering pinion 1 must, depending on the configuration and design of the applicable steering system, for example, transmit large torques of up to 250 Nm. For this reason, in the prior art each steering pinion is formed as a single part, manufactured by metal cutting processes from a solid piece, and usually additionally hardened, in order to ensure that it is capable of the demands placed upon it to transmit the high torques with the required precision in steering the motor vehicle, as well as having a high degree of stability and an adequate service life.

The steering pinion 1 is accordingly provided as a coupling connection between the steering shaft 3 and the gear rack 4. In order to be able to fulfill this function, it has a toothed section for meshing with the gear rack 4 and a connection section 10 for connecting to the steering shaft 3.

Figures 2, 3:
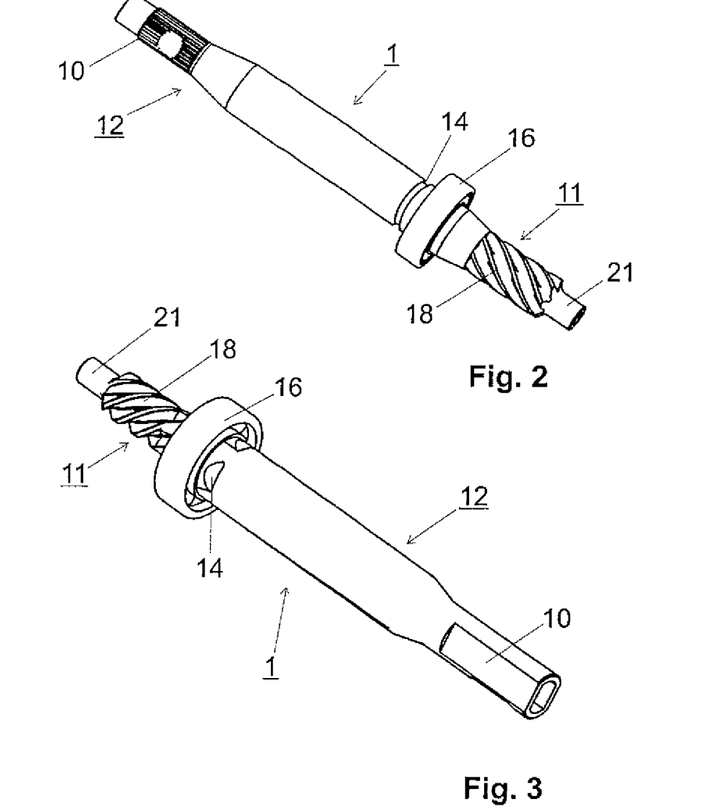
FIG. 2 is a schematic perspective view of a steering pinion according to a first embodiment.
FIG. 3 is a schematic perspective view of a steering pinion according to one embodiment.

FIG. 2 shows a steering pinion 1 according to the present disclosure. The steering pinion 1 has a connection part 12 and a toothed part 11, with the toothed part 11 and the connection part 12 formed as two separate components which are connected together in at least a rotationally fixed manner in order to form the steering pinion 1. The toothed part 11 has the toothed section 18 for meshing with the gear rack 4, and the connection part 12 has the connection section 10 for connection to the steering shaft 3.

Figure 12:
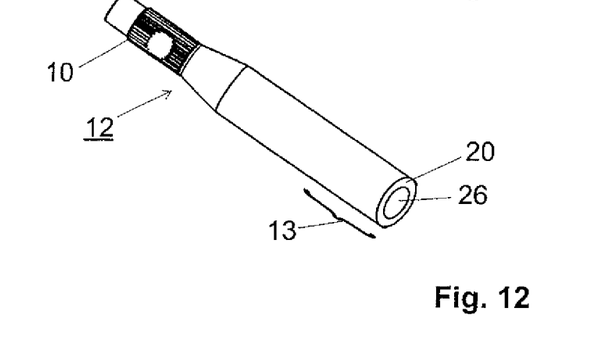
FIG. 12 is a schematic perspective view of an embodiment of a connection part.

In an embodiment, the connection section 10 of the connection part 12 is, as seen in FIGS. 2 and 12, tapered relative to the remainder of the shaft of the connection part 12, and has a ribbing in order to ensure that the connection to the steering shaft 3 is rotationally fixed. Besides the ribbing that is shown, other measures affecting the geometry can also be used to achieve an adequately rotationally fixed connection—capable of being assembled and disassembled—between the connection part 12 and a steering shaft 3. In an exemplary embodiment, the ribbing is in the form of a spline, or a polygon. This spline, or plurality of surfaces and flat sections formed as a polygon, may be produced in a reforming process by pressing or hammering. Production by means of a high internal pressure method is conceivable and possible. To assemble the connection part 12 with the steering shaft 3, a screwed bolt—not shown here in the Figures—is normally provided. The connection part 12 further has a fixing area 13, in which a receptacle in the form of a cylindrical opening 26 is disposed. At the end of the connection part 12 that faces away from the connection section 10, an end face is formed which surrounds the opening 26 and serves as a shoulder 20 in the steering pinion 1.

The toothed part 11 has, in the area of the toothed section 18, helical toothing which is intended to mesh with the gear rack 4 of the steering system. Rotation of the steering pinion 1, and in particular of the toothed part 11, accordingly brings about translational movement of the gear rack 4. Although helical toothing is depicted in the example embodiment that is shown, it is also possible to use any other toothing that enables the transmission of force from the toothed part 11 to the gear rack 4.

Figure 5:
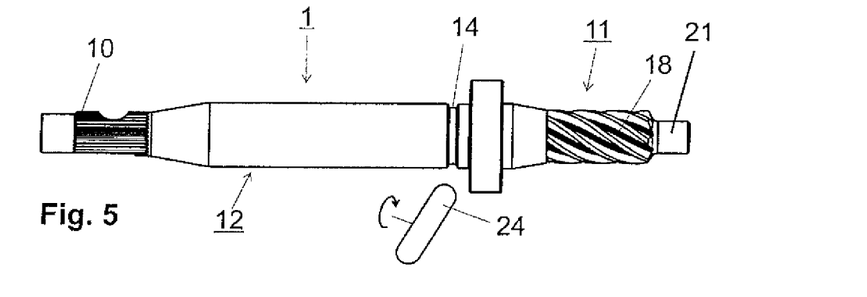
FIG. 5 is a schematic side elevation view of a steering pinion according to one embodiment.
Figure 6:
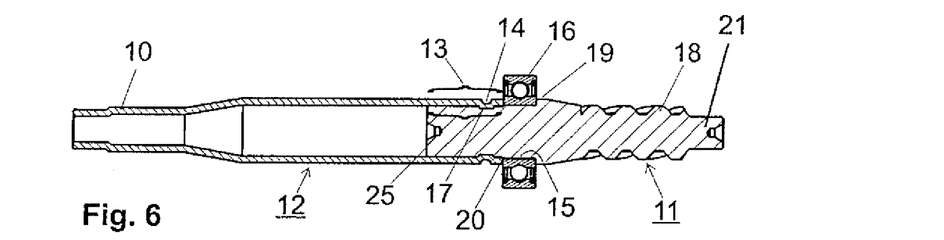
FIG. 6 is a schematic cross section through the steering pinion shown in FIG. 5.

The connection part 12 and the toothed part 11 are connected to each other in a rotationally fixed manner by being pressed together such that a press fit is formed. The connection part 12 and the toothed part 11 overlap in a fixing area 13 of the connection part 12 and a fixing section 25 of the toothed part 11, as can be seen in FIGS. 5 and 6 and/or 7 and 8.

In an embodiment, this connection between the toothed part 11 and the connection part 12 is formed to be durable and not disassemblable. The term "not disassemblable" is to be understood in the present disclosure to mean not that disassembly is completely impossible, but that the design is such that disassembly and subsequent reassembly of the disassembled parts is not intended.

The formation of a rotationally fixed press fit is aided by the provision of material elevations, such as nubs, a knurl or a roller-burnished region in the fixing section 25 of the toothed part 11. The fixing area 13 and/or the fixing section 25 can also be formed slightly conically over at least part of its length, in order to simplify the formation of a press fit when pressing the two components together, and so facilitate assembly.

In order to provide—alongside the formation of a rotationally fixed connection—protection from axial displacement, or against the pulling apart of the toothed part 11 relative to the connection part 12, protection against pulling apart in the region 14, for example, in the form of a circumferential beading, is provided, by means of which the connection part 12 is fixed to the toothed part 11 in the direction of pulling apart or in the direction of the axis of the steering pinion 1. The precise formation of the protection against pulling apart region 14 will be described in the context of the descriptions of the example embodiments in FIGS. 5 and 6 and/or 7 and 8.

Protection against pulling apart of the connection part 12 and the toothed part 11 can additionally be achieved by the press fit, such that, in a particular embodiment, the pressing of the connection part 12 onto the toothed part 11 is sufficient in itself to protect against disassembly.

To support the steering pinion in the housing of the steering gear, a bearing is provided. In one embodiment, at least one rolling bearing 16 is used. This rolling bearing 16 can be formed in a simple manner integrally with the steering pinion 1 of the present disclosure. To achieve this the rolling bearing 16 is, in an embodiment, disposed between the connection part 12 and the toothed part 11. The rolling bearing 16 is positioned by means of a first shoulder 19 disposed on the toothed part 11 and by means of a second shoulder 20 formed by the end face of the connection part 12 which faces the toothed part 11. The rolling bearing 16 is retained between the toothed part 11 and the connection part 12 by the pressing together of the toothed part 11 with the connection part 12. In an exemplary embodiment, a pre-tension is applied in this manner by the two above-mentioned parts to the rolling bearing 16, with the result that the rolling bearing 16 is retained non-positively between the connection part 12 and the toothed part 11.

In addition to the rolling bearing 16, which serves as a radial bearing, a further bearing 21 can be provided, which serves as an axial bearing. This bearing 21 can be formed as a sliding bearing or as a rolling bearing.

The bearing 21 can also be a radial bearing, in addition to an axial bearing. It is conceivable and possible to provide the axial bearing in the rolling bearing 16 and dispense with the bearing 21.

In the embodiment shown in FIG. 3, a further example of a steering pinion 1 with a toothed part 11 and a connection part 12 is shown, in which the connection part 12 is formed from a tube. In this case, the connection section 10 is produced by a flattening and tapering of the tube, so that a connection of the steering shaft 3 to the connection section 10 can be made by means of a receptacle in the steering shaft 3, which cooperates with the connection section 10.

In order, in addition to the rotationally fixed connection, to achieve fixing and security in an axial direction, protection against pulling apart region 14 is also provided, such as in the form of non-circumferential depressions.

Figure 4:
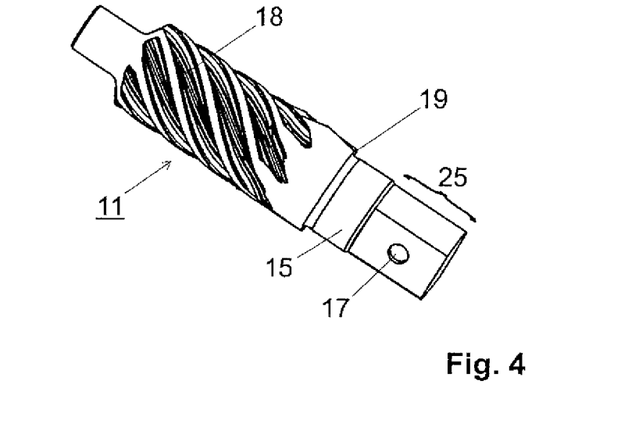
FIG. 4 is a schematic perspective view of a toothed part according to one embodiment.

FIG. 4 shows a toothed part 11 formed from a solid piece, which has, in addition to the actual toothed section 18, a bearing seat 15, which is provided to accommodate a rolling bearing 16, such as shown in FIGS. 2 and 3. In an exemplary embodiment, the axial extension of the bearing seat 15 is smaller than the axial extension of the rolling bearing 16. In other words, the rolling bearing 16 is wider than the bearing seat 15. In this manner, it is possible to achieve the adjustment to a predetermined value of the pre-tension which is applied to the rolling bearing 16 by the shoulder 19 of the toothed part 11 and the shoulder 20 of the connection part 12—independently of the tolerances in the widths. Accordingly, the connection part 12 and the toothed part 11 do not abut each other in a manner that would prohibit the application of the pre-tension to the rolling bearing 16.

The fixing section 25 of the toothed part 11 is also shown, onto which the complementary fixing area 13 of the connection part 12 is pushed or pressed in a subsequent operation. The fixing section 25 here shows a depression 17, into which material of the connection part 12 can flow, in order to produce here a positive connection in the axial direction of the steering pinion 1 between the connection part 12 and the toothed part 11. By this means, additional pre-tension can also be applied to the rolling bearing 16, in order to retain the rolling bearing 16 in the desired position.

The fixing section 25 further shows a flattened cross-sectional geometry, which is suitable for forming an alternative rotationally fixed connection.

In order to be able to fix the rolling bearing 16 during the production of the steering pinion 1 in a precise manner and for its entire service life, the inner race of the rolling bearing 16 is fixed under pre-tension on the bearing seat 15 between a shoulder 19 disposed on the toothed part 11 and the shoulder 20, which is formed by the end of the connection part 12, which faces the rolling bearing 16. The pre-tension is, in one embodiment, applied during the pressing of the toothed part 11 together with the connection part 12, and maintained by the resulting press fit.

Figure 10:
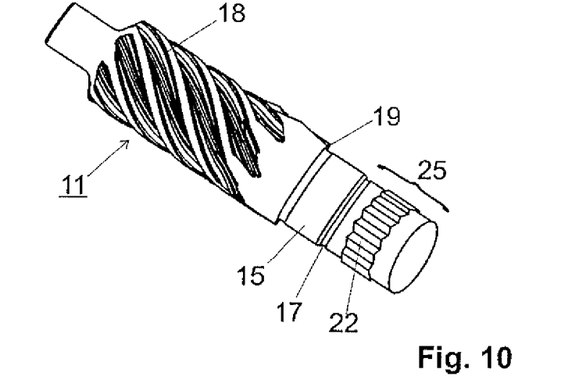
FIG. 10 is a schematic perspective view of a toothed part according to one embodiment.
Figure 11:
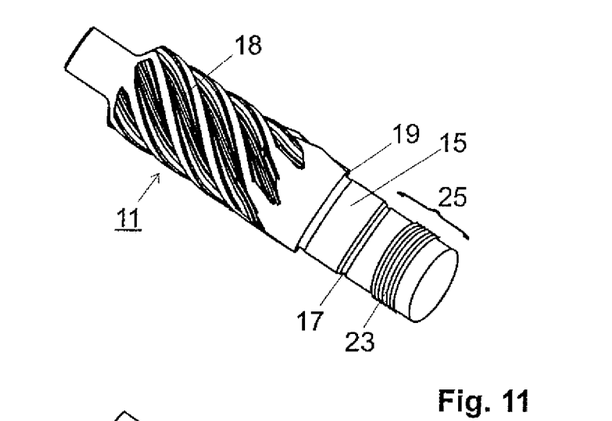
FIG. 11 is a schematic perspective view of a toothed part according to one embodiment.

The formation of a rotationally fixed press fit of the tube-shaped connection part 12 on the fixing section 25 of the toothed part 11 can, in one embodiment, be achieved by providing material elevations on the fixing section 25 of the toothed part 11, which provide an additional non-positive and, in one embodiment, also positive connection between the connection part 12 and the toothed part 11. The material elevations are for example in the form of nubs, but may be in the form of a knurl 22, such as shown in FIG. 10, or in the form of a roller-burnished region 23, such as shown in FIG. 11.

The embodiment shown in FIGS. 5 and 6 shows an additional embodiment of a steering pinion 1. In this embodiment, a circumferential beading is provided in the connection part 12, which forms the protection against pulling apart region 14. The protection against pulling apart region 14 in the form of the beading is disposed in the connection part 12 in a position corresponding to a depression or groove 17 below it in the toothed part 11. Accordingly, the beading, which serves as the protection against pulling apart region 14, is formed around the entire circumference of the connection part 12, and in this manner provides reliable protection against pulling apart. By means of a beading operation, material from the connection part 12, which is formed as a tube, is rolled into the depression 17, which is in the form of a circumferential groove, so that material flows into the groove.

The flowing of material into the groove 17 also applies further pre-tension to the rolling bearing 16, which as a result can be retained fixedly in its position.

A beading operation of this kind can form the circumferential beading around the depression 17 in a simple manner, using a roller 24, indicated schematically, which is set in rotation. The material of the connection part 12 accordingly flows into the depression 17 of the toothed part 11. By means of such rolling, the strength of the connection between the connection part 12 and the toothed part 11 can also be increased over the entire area of the fixing section 25 and the fixing area 13. The stresses acting in the axial direction provide a corresponding material flow, which also forces material into the depressions between the material elevations. In addition, pre-tension is applied to the rolling bearing 16 to fix the rolling bearing 16 between the shoulder 19 of the toothed part 11 and the shoulder 20 of the connection part 12.

Particularly in FIG. 6, it is clear to see that not only is the rolling bearing 16 retained on the toothed part 11 by being pushed onto or accommodated on the bearing seat 15, but also in particular that a corresponding pre-tension is applied by the pressed-on connection part 12, which provides a positive-locking fit and a corresponding pre-tension by directly abutting the rolling bearing in the area of the bearing seat, with the result that the rolling bearing is also fixed in place when the connection part 12 is pressed onto the toothed part 11.

Figure 7:
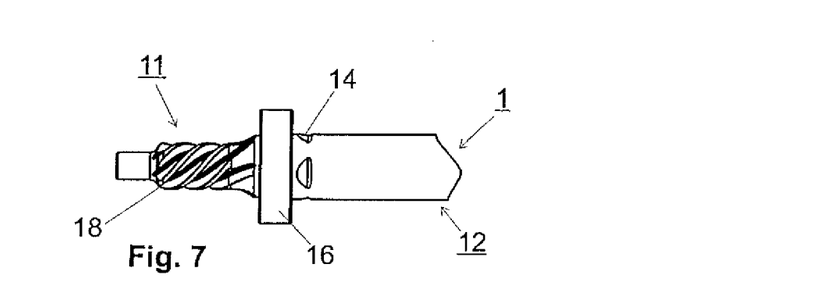
FIG. 7 is a schematic side elevation view of a detail of a further steering pinion according to one embodiment.
Figure 8:
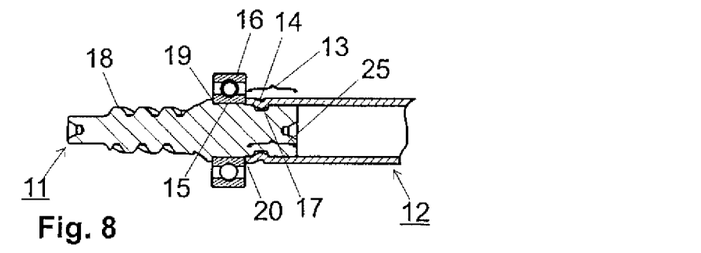
FIG. 8 is a schematic cross section through the detail of the steering pinion shown in FIG. 7.

FIGS. 7 and 8 show an additional embodiment, in which the protection against pulling apart region 14 of the connection part 12 has again been carried out by means of simple pressing of material from the connection part 12 into a corresponding depression in the toothed part 11.

In FIG. 8 it can also be seen that not only is the tube-shaped connection part 12 pressed onto the fixing section 25 of the toothed part 11 in order to achieve a rotationally fixed connection, but also, in the area of the protection against pulling apart region 14, material from the connection part 12 is introduced into a depression 17 in the form of a recess. The material of the connection part 12 is simply pressed into the depression 17 in this manner to produce a positive-locking fit as protection against pulling apart.

In FIG. 8 it can again be seen clearly that the rolling bearing 16 is positively retained in the steering pinion 1 by the connection part 12. For this purpose, in the toothed part 11, a shoulder 19, which the rolling bearing 16 abuts, is formed in the end of the bearing seat 15 facing away from the fixing section 25. Accordingly the rolling bearing 16 is held compressively, and thereby securely retained, between the shoulder 19 and the shoulder 20, which is formed by the end of the connection part 12. A pre-tension is, in one embodiment, applied to the rolling bearing 16 in the axial direction, with the result that it is retained securely.

Because the toothed part 11 is formed from a solid piece and the connection part 12 is formed as a conventional tube, the steering pinion can be produced cost-effectively, and the use of high-grade material in the pinion can be reduced.

Figure 9:
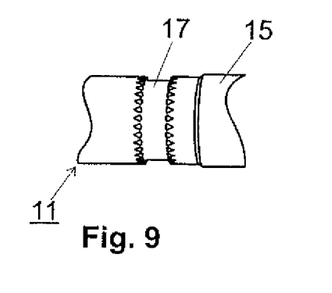
FIG. 9 is a schematic detail view of a groove in a toothed part according to one embodiment.

FIG. 9 shows an additional measure to further increase the resistance to rotation of the connection part 12 relative to the toothed part 11. In particular, the edges of the depression 17 in the form of the circumferential groove in the toothed part 11 are serrated or knurled. When material of the connection part 12 is introduced into, or flows into, the depression 17, the resistance to rotation is at the same time increased further by means of the serrated edge.

The toothed part 11 is, in one embodiment, produced by means of a cold forming process, and the connection part 12 is formed from a tube. As a result, an advantageous selection of material can be carried out, in that the toothed part 11 can be formed in accordance with the requirements placed upon it in terms of strength in the toothed area, as a part cut from a solid piece of material and possibly hardened, while in contrast the connection part 12 can be formed using a less expensive and/or lighter material, and be formed as a tube, which can also achieve a saving of material.

In order to produce the steering pinion 1, a toothed part 11 and a connection part 12 are first provided. The connection part 12 is then connected in a rotationally fixed manner to the toothed part 11. This rotationally fixed connection is achieved by pressing.

In certain embodiments the protection against pulling apart region 14 is additionally produced, in that the connection part 12 undergoes a beading operation in the location of a corresponding depression 17 in the toothed part 11, and material of the connection part 12 accordingly flows into the depression 17.

In a further advantageous embodiment, prior to the pressing of the connection part 12 onto the toothed part 11, the rolling bearing 16 is in addition pushed or pressed onto the bearing seat 15 of the toothed part 11, and only then is the connection part 12 pressed onto the fixing section 25 of the toothed part 11. In this manner a pre-tension is again applied to the rolling bearing 16 in the axial direction, in order to fix it securely.

In FIG. 10 a toothed part 11 is illustrated in which the fixing section 25 is provided with a knurl 22. In FIG. 11 a toothed part 11 is illustrated in which the fixing section 25 is provided with a roller-burnished region 23. The external diameter of the greatest material elevation of the roller-burnished region 23 or the knurl 22 is greater than the internal diameter of the opening 26 of the connection part 12 in the fixing area 13. When the connection part 12 is pushed onto the fixing section 25, the tips of the material elevations of the roller-burnished region or knurl are flattened and dig themselves into the inner surface of the opening of the fixing area 13 of the connection part 12. A non-positive connection is thereby achieved, and/or a press fit is formed, which enables the fixed connection. In an embodiment, the widening of the connection part 12 in the fixing area 13 remains below 0.2 mm, in order to achieve a durable connection. The connection can thereby be formed in such a durable manner that no additional protection against pulling apart region 14, with a corresponding depression 17, is necessary.

To the extent practicable, all individual features described in the individual example embodiments can be combined with each other and/or exchanged, without departing from the field of the invention.

The invention claimed is:

1. A steering pinion comprising:
   a toothed part including a toothed section for meshing with a gear rack; and
   a connection part including a connection section for connecting to a steering shaft, wherein the toothed part and the connection part are pressed together in a rotationally fixed manner, the toothed part comprises a bearing seat to accommodate a rolling bearing, and the bearing seat has a smaller axial extension than an axial extension of the rolling bearing.

2. The steering pinion of claim 1, wherein the connection part and the toothed part overlap.

3. The steering pinion of claim 2, wherein a fixing section of the toothed part overlaps with a fixing area of the connection part.

4. The steering pinion of claim 3, wherein material elevations and/or material depressions are provided in the fixing section and/or the fixing area for increasing torque transmission.

5. The steering pinion of claim 4, wherein the material elevations and/or material depressions comprise nubs, knurls, roller-burnished regions and/or grooves.

6. The steering pinion of claim 3, wherein the fixing section and/or the fixing area are formed conically.

7. The steering pinion of claim 1, wherein connection between the toothed part and the connection part is durable and not disassemblable.

8. The steering pinion of claim 1, wherein the toothed part and the connection part comprise different materials.

9. The steering pinion of claim 1, wherein the toothed part comprises a depression in which material of the connection part is accommodated.

10. The steering pinion of claim 1, wherein the rolling bearing is retained between the toothed part and the connection part.

11. The steering pinion of claim 10, wherein the toothed part and the connection part exert a pre-tension on the rolling bearing.

12. The steering pinion of claim 1, wherein the toothed part is formed as a solid piece and the connection part is formed as a tube.

13. The steering pinion of claim 1, wherein the toothed part further comprises an axial bearing.

14. A method for producing a steering pinion, comprising:
providing a toothed part having a toothed section;
introducing at least one depression in the toothed part;
providing a connection part having a connection section;
introducing material of the connection part into the depression, wherein the material is introduced by rolling, roller burnishing or forming a bead; and
pressing the toothed part and the connection part together to produce a rotationally fixed connection.

15. The method of claim 14, wherein the at least one depression comprises a groove and/or recess.

16. The method of claim 14, further comprising accommodating a rolling bearing on a bearing seat on the toothed part prior to the pressing.

17. The method of claim 16, further comprising pressing the rolling bearing between the toothed part and the connection part.

18. The method of claim 17, wherein the toothed part and the connection part exert a pre-tension on the rolling bearing.

* * * * *